United States Patent [19]
Verduyn

[11] Patent Number: 6,065,796
[45] Date of Patent: May 23, 2000

[54] TRACK AND TROLLEY ASSEMBLY FOR USE WITH A TARPAULIN ENCLOSING SYSTEM ON A FLAT BED TRAILER

[75] Inventor: Lloyd Verduyn, Hamilton, Canada

[73] Assignee: Verduyn Tarps Inc., Hamilton, Canada

[21] Appl. No.: 09/296,293

[22] Filed: Apr. 22, 1999

[51] Int. Cl.$^7$ .................................................. B60P 7/02
[52] U.S. Cl. ............................... 296/100.12; 296/100.01; 296/100.03; 296/100.17; 410/50
[58] Field of Search ..................... 296/100.01, 100.12, 296/100.16, 100.03, 105, 65.13; 410/47, 49, 50

[56] References Cited

U.S. PATENT DOCUMENTS

| | | | |
|---|---|---|---|
| 4,342,480 | 8/1982 | Ross, Jr. .................................. | 296/100 |
| 4,611,848 | 9/1986 | Romano ................................... | 296/100 |
| 5,546,972 | 8/1996 | Wardell et al. ......................... | 296/105 X |
| 5,888,039 | 3/1999 | Cooley ...................................... | 410/50 |
| 5,924,759 | 7/1999 | DeMonte et al. ................... | 296/100.12 |
| 5,988,728 | 11/1999 | Lund et al. .......................... | 296/100.03 |

*Primary Examiner*—Joseph D. Pape
*Assistant Examiner*—Lori L. Coletta
*Attorney, Agent, or Firm*—Patrick J. Hofbauer

[57] ABSTRACT

A track and trolley assembly for use with a tarpaulin enclosing system on a flat bed trailer comprises a plurality of trollies for operatively supporting the tarpaulin enclosing system, each trolley having a frame member, at least one weight-bearing roller mounted on the frame member for rotation about a substantially horizontal axis and at least one stabilizing roller mounted on the frame member for rotation about a substantially vertical axis. An elongate track has a length, a substantially vertical trailer mounting face, a substantially horizontal weight-bearing roller receiving surface disposed along the length of the elongate track means, and at least one substantially vertical stabilizing roller receiving surface disposed along the length of the elongate track. A rail is disposed substantially along the length of the elongate track and has a length, a substantially vertical trailer mounting face, and a hook-receiving rail portion disposed in laterally outwardly projecting cantilever relation from the trailer mounting face so as to be free and clear of the substantially vertical trailer mounting face, and disposed above the substantially horizontal weight-bearing roller receiving surface of the elongate track and above the at least one substantially vertical stabilizing roller receiving surface of the elongate track, for receiving at least one tie-down hook in releasably retained relation therealong. The trollies move along the elongate track, such that the frame members of the trollies are disposed horizontally outboard of the hook-receiving rail portion of the rail.

23 Claims, 11 Drawing Sheets

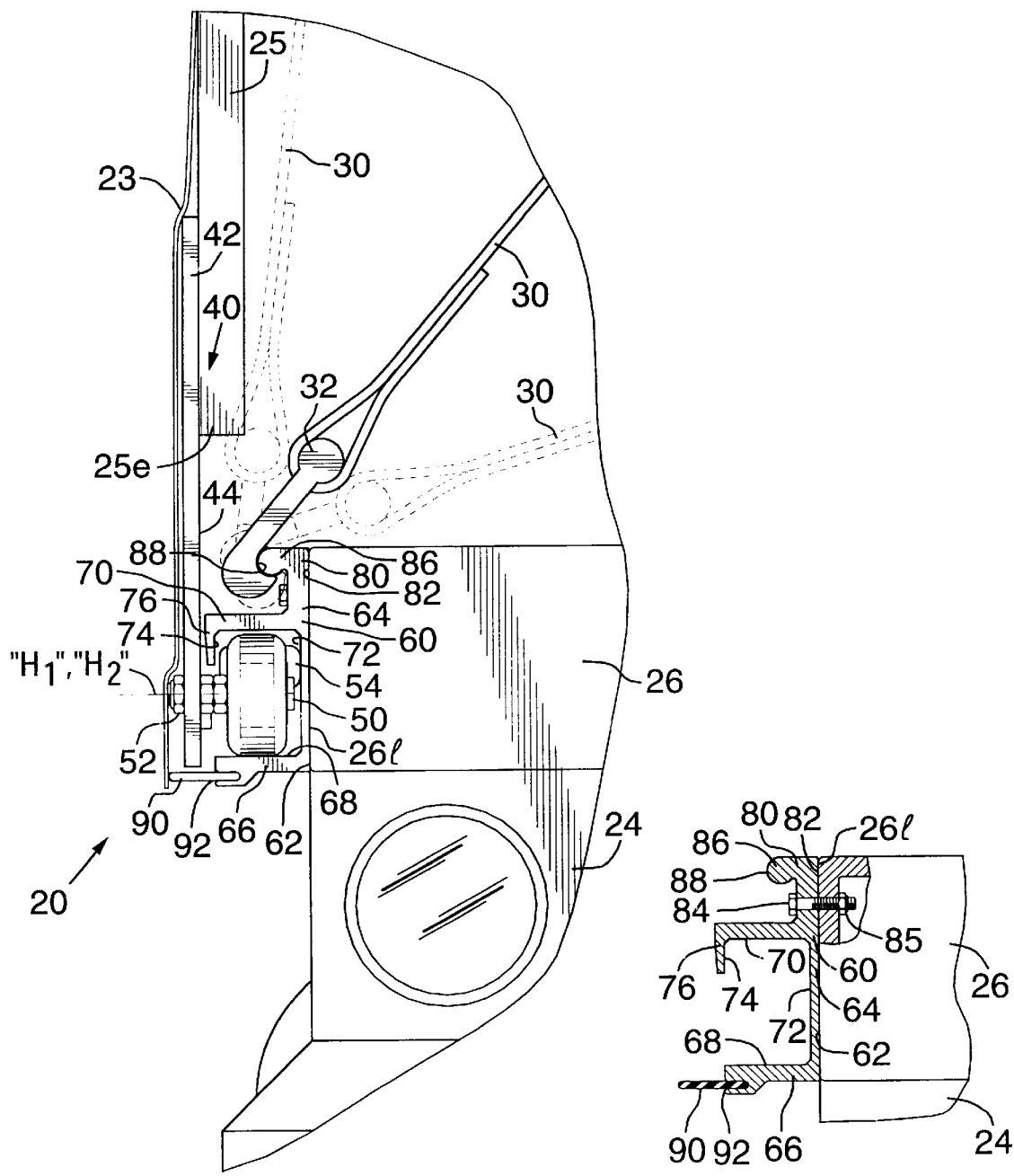

6,065,796

TRACK AND TROLLEY ASSEMBLY FOR USE WITH A TARPAULIN ENCLOSING SYSTEM ON A FLAT BED TRAILER

FIELD OF THE INVENTION

The present invention relates to flat bed trailers and more particularly to track and trolley assemblies for use with a tarpaulin enclosing system on flat bed trailers.

BACKGROUND OF THE INVENTION

Flat bed tractor trailers having a retractable tarping system are used to transport a wide variety of freight, much of which freight cannot be loaded into conventional van type transport trailers having in-situ walls and roof. The tarping system comprises a tarpaulin supported by a plurality of vertically disposed frame members that span across the bed of the trailer and are attached at each of their opposite free ends to a respective trolley having rollers that engage an elongate track disposed along each side of the trailer. The trollies are manually urged along the elongate tracks to move the tarpaulin system between its trailer enclosing configuration and its open configuration. A typical prior art track, as taught in Canadian Patent 1,331,635, comprises an inverted "U"-shaped channel with an additional lower horizontal flange to support the wheels of the trolleys. Another typical prior art track comprises a "C"-shaped channel with an outer upwardly projecting flange, as produced by TILL-FAB LTD. of Norwich, Canada, and as disclosed in a published promotional brochure entitled "ROLL-TITE$_{TM}$" Flat Deck Tarping Systems. Yet another prior art track is produced by the present inventor, and has a "C"-shaped channel disposed above and inverted "U"-shaped channel.

For flat bed trailers having any type of prior art tarping system tracks installed thereon, a transported load must be secured by straps anchored at their ends to the sides of the trailers and tightly spanning across the trailer, over or through the load on the trailer. Typically, in order to accommodate the anchoring of the ends of such straps, the elongate tarping system tracks are mounted in spaced relation from the sides edges of the trailer bed by means of a plurality of metal webs, or similar spacing means interposed between the track and the side edges of the trailer. In this manner, the straps are able to pass between the track and the edge of the trailer bed so as to hook onto an appropriate anchoring means, such as the metal webs. Such spacing of the elongate tracks from the side edges of the trailer bed presents a serious problem, as it significantly, and in many cases unacceptably, adds to the overall width of the trailer bed. The overall width of a trailer bed is limited in many jurisdictions to 102 inches, including the elongate tracks and trolleys of the tarping system. Since most tarping systems are installed onto existing trailers, there is typically very little room, if any, for the inclusion of the elongate tracks and trolleys, and in some instances, trailers having tarpaulin systems installed thereon are wider than the maximum width permitted by local laws. Accordingly, providing spacing between the trailer bed and the elongate track, in order to receive the ends of the straps, is an extremely inefficient use of space, and may constitute an unacceptable use of space, as it may be an illegal practice.

In order to preclude over-width flat bed trailers, the elongate tracks of the tarping system may be secured directly to the side edges of the trailer, with no spacing between the elongate tracks and the side edges of the trailer. In this case, the straps pass through small cut-out sections in the floor of the trailer bed inboard of the side edges of the trailer bed. However, these openings reduce the effective carrying width of the trailer, which is highly undesirable. Moreover the provision of such openings in the trailer may interfere with the structural integrity of the trailer and will, in any event, constitute a significant additional capital cost for the trailer.

Another problem associated with prior art elongate tracks is that of receiving and retaining dirt and small debris in their interiors, which dirt and debris preclude the smooth operation of trolleys along the length of the tracks.

It is an object of the present invention to provide a track and trolley assembly for use with a tarpaulin enclosing system on a flat bed trailer, which track and trolley assembly precludes the inclusion of a space between the track and the side edge of the flat bed trailer.

It is another object of the present invention to provide a track and trolley assembly for use with a tarpaulin enclosing system on a flat bed trailer, which track and trolley assembly is mountable onto existing flat bed trailers without increasing the overall width of the trailer beyond a legal limit.

It is yet another object of the present invention to provide a track and trolley assembly for use with a tarpaulin enclosing system on a flat bed trailer, which track and trolley assembly precludes the need for cut-out sections in the floors of flat bed trailers for receiving tie-down straps therethrough.

It is yet another object of the present invention to provide a track and trolley assembly for use with a tarpaulin enclosing system on a flat bed trailer, which track and trolley assembly substantially precludes the entry of dirt and small debris into its interior.

SUMMARY OF THE INVENTION

In accordance with one aspect of the present invention, there is disclosed a track and trolley assembly for use with a tarpaulin enclosing system on a flat bed trailer defining a central longitudinal axis and having a bed portion defined by left and right lateral side edges. The track and trolley assembly comprises a plurality of trollies for operatively supporting the tarpaulin enclosing system, each trolley having a frame member, at least one weight-bearing roller mounted on the frame member for rotation about a substantially horizontal axis and at least one stabilizing roller mounted on the frame member for rotation about a substantially vertical axis. An elongate track means has a length, a substantially vertical trailer mounting face, a substantially horizontal weight-bearing roller receiving surface disposed along the length of the elongate track means, and at least one substantially vertical stabilizing roller receiving surface disposed along the length of the elongate track means. A rail means is disposed substantially along the length of the elongate track means and has a length, a substantially vertical trailer mounting face, and a hook-receiving rail portion disposed in laterally outwardly projecting cantilever relation from the trailer mounting face so as to be free and clear of the substantially vertical trailer mounting face, and disposed above the substantially horizontal weight-bearing roller receiving surface of the elongate track means and above the at least one substantially vertical stabilizing roller receiving surface of the elongate track means, for receiving at least one tie-down hook in releasably retained relation therealong. The trollies move along the elongate track means such that the frame members of the trollies are disposed horizontally outboard of the hook-receiving rail portion of the rail means.

Other advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, the latter of which is briefly described hereinbelow.

BRIEF DESCRIPTION OF THE DRAWINGS

The novel features which are believed to be characteristic of the track and trolley assembly for use with a tarpaulin enclosing system on a flat bed trailer, according to the present invention, as to its structure, organization, use and method of operation, together with further objectives and advantages thereof, will be better understood from the following drawings in which two embodiments of the invention will now be illustrated by way of example. It is expressly understood, however, that the drawings are for the purpose of illustration and description only, and are not intended as a definition of the limits of the invention. In the accompanying drawings:

FIG. 6 is an end elevational view of the preferred embodiment track and trolley assembly of FIG. 1, and additionally showing the hook and strap members in ghost outline in two alternative angular positions;

FIG. 7 is an enlarged end elevational view of a portion of FIG. 6, with the trolley member removed for the sake of clarity and showing a portion of the trailer bed in cross-section;

DETAILED DESCRIPTION OF A PREFERRED EMBODIMENT

Figure 1:
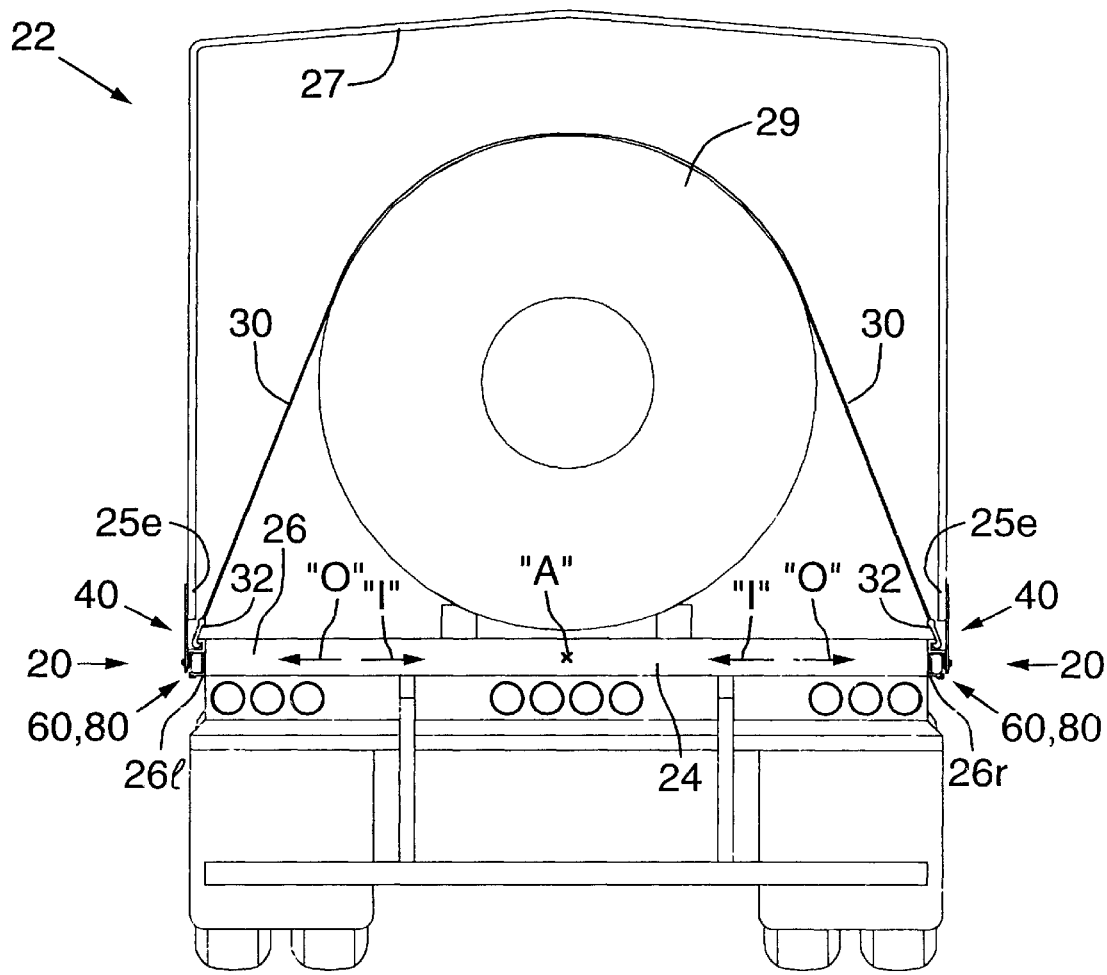
FIG. 1 is a rear end elevational view of a preferred embodiment of the track and trolley assembly according to the present invention installed on a flat bed trailer having a tarpaulin enclosing system, with the tarpaulin enclosing system drawn over the flat bed trailer.

Reference will now be made to FIGS. 1 through 11 of the drawings, which show a preferred embodiment of track and trolley assembly, as indicated by the general reference numeral 20. As can be best seen in FIGS. 1 through 3, the track and trolley assembly 20 is for use with a tarpaulin enclosing system, as indicated by the general reference numeral 22, on a flat bed trailer 24. The flat bed trailer 24 defines a central longitudinal axis "A", and for purposes of this discussion, various components, surfaces, or the like, may be referred to as outwardly facing or projecting, or the like. Such references to outwardly and inwardly are made with reference to the central longitudinal axis "A", respective directions of which are indicated by arrows "O" and "I", respectively, in FIG. 1.

Figures 10, 11:
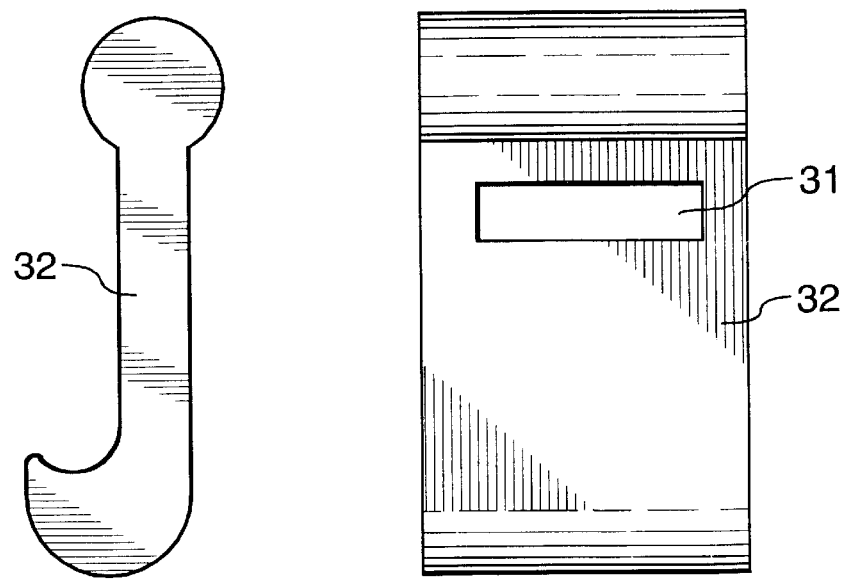
FIG. 10 is an end elevational view of the hook member that engages the left rail of the preferred embodiment track and trolley assembly, as seen in FIGS. 1 and 4.
FIG. 11 is a side elevational view of the hook member of FIG. 10.

The flat bed trailer 24 has a bed portion 26 laterally defined by left 26l and right 26r outwardly facing lateral side edges. The tarpaulin enclosing system 22 includes a pliable fabric tarpaulin 23 mounted on and supported by a plurality of inverted "U"-shaped rib members 25. Adjacent rib members 25 are operatively interconnected by spar members 27 pivotally connected at their lower ends 27p to trollies, as indicated by general reference numeral 40, of the track and trolley assembly 20, and are pivotally connected one to the next at their upper ends 27u. The two most forward "U"-shaped rib members 25 are secured to each other by lateral re-enforcing ribs 21, as are the two most rearward "U"-shaped rib members 25. Tie-down straps 30 having a tie-down hook 32 disposed at each opposite end, which tie-down hooks 32 are shown enlarged in FIGS. 10 and 11, are used to secure a load 29 to the bed portion 26 of the flat bed trailer 24, as can be best seen in FIG. 1.

The track and trolley assembly 20 comprises a plurality of trollies 40 for operatively supporting the tarpaulin enclosing system 20, which trollies 40 are disposed along both the left 26l and right 26r side edges of the bed portion 26 of the flat bed trailer 24. Each trolley 40 has a frame member 42 manufactured from a ⅜" thick robust aluminum plate. Two trollies 40 are secured one at each of the ends 25e to each inverted "U"-shaped rib member 25 by means of welding the rib member 25 to the inwardly facing surface 44 of the frame member 42. In this manner, each rib member 25 rigidly interconnects two trollies 40, one trolley 40 at each of the left 26l and right 26r side edges.

Each of the trollies 40 comprises at least one weight-bearing roller, and in the preferred embodiment illustrated, comprises a first weight-bearing roller 46 disposed forwardly of a second weight-bearing roller 48. The first 46 and second 48 weight-bearing rollers are mounted on the frame member by means of suitable threaded fasteners 50 and co-operating nuts 52 for rotation about respective substantially horizontal axes "$H_1$" and "$H_2$". In the preferred embodiment illustrated, the first 46 and second 48 weight-bearing rollers are the same diameter and the axes "$H_1$" and "$H_2$" are disposed at substantially the same elevation. Each of the trollies 40 further comprises at least one stabilizing roller 54, and in the preferred embodiment illustrated, each of the trollies 40 has a first stabilizing roller 54 interposed between the first 46 and second 48 weight-bearing rollers. Also, each of the trollies 40 further comprises a second stabilizing roller 56 disposed behind the second weight bearing roller 48. The first 54 and second 56 stabilizing rollers are mounted on respective horizontal bracket portions 55,57 of the frame member 42 by means of suitable threaded fasteners 58 and cooperating nuts 59 for rotation about respective substantially vertical axes "$V_1$" and "$V_2$". In the preferred embodiment illustrated, the first 54 and second 56 stabilizing rollers are the same diameter and the axes "$V_1$" and "$V_2$" are disposed at a common distance from the central longitudinal axis "A".

An elongate track means 60 having a length "L$_t$" comprises a substantially vertical trailer mounting face 62 disposed on a substantially vertical wall portion 64 in laterally inwardly facing relation to a lateral side edge **26*l*,26*r* of the bed portion 26 of the flat bed trailer 24. As can be best seen in FIGS. 6, 7, and 8, a substantially horizontal lower shelf portion 66 projects laterally outwardly from the substantially vertical wall portion 64, with a substantially horizontal weight-bearing roller receiving surface 68 disposed along the length of the elongate track means 60 atop the substantially horizontal lower shelf portion 66. A substantially horizontal upper shelf portion 70 projects laterally outwardly from the substantially vertical wall portion 64 and is disposed above the lower shelf portion 66**.

The first 46 and second 48 weight-bearing rollers are disposed between the upper 70 and lower 66 shelf portions, with the first 46 and second 48 weight bearing rollers being borne in weight bearing relation on the substantially horizontal weight-bearing roller receiving surface 68 for rolling contact along the length of the elongate track means 60. A downwardly depending flange portion 76 downwardly depends from the substantially horizontal upper shelf portion 70. There is at least one substantially vertical stabilizing roller receiving surface disposed along the length of the elongate track means, and in the preferred embodiment illustrated, the at least one substantially vertical stabilizing roller receiving surface comprises opposed first 72 and second 74 substantially vertical stabilizing roller receiving surfaces. The first substantially vertical stabilizing roller receiving surface 72 is disposed on the substantially vertical wall portion 64 in laterally outwardly facing relation to a lateral side edge **26*l*,26*r* of the bed portion 26 of the flat bed trailer 24. The second substantially vertical stabilizing roller receiving surface 74 is disposed on the downwardly depending flange portion 76 in laterally inwardly facing relation to a lateral side edge 26*l*,26*r* of the bed portion 26 of the flat bed trailer. The downwardly depending flange portion 76, having the second substantially vertical stabilizing roller receiving surface 74 disposed thereon, is disposed along the length of the elongate track means 60 horizontally outboard of the first 46 and second 48 weight-bearing rollers and the first 54 and second 56 stabilizing rollers to preclude unchecked outward horizontal movement of the trollies 40 with respect to the track means 60**.

Figure 2:
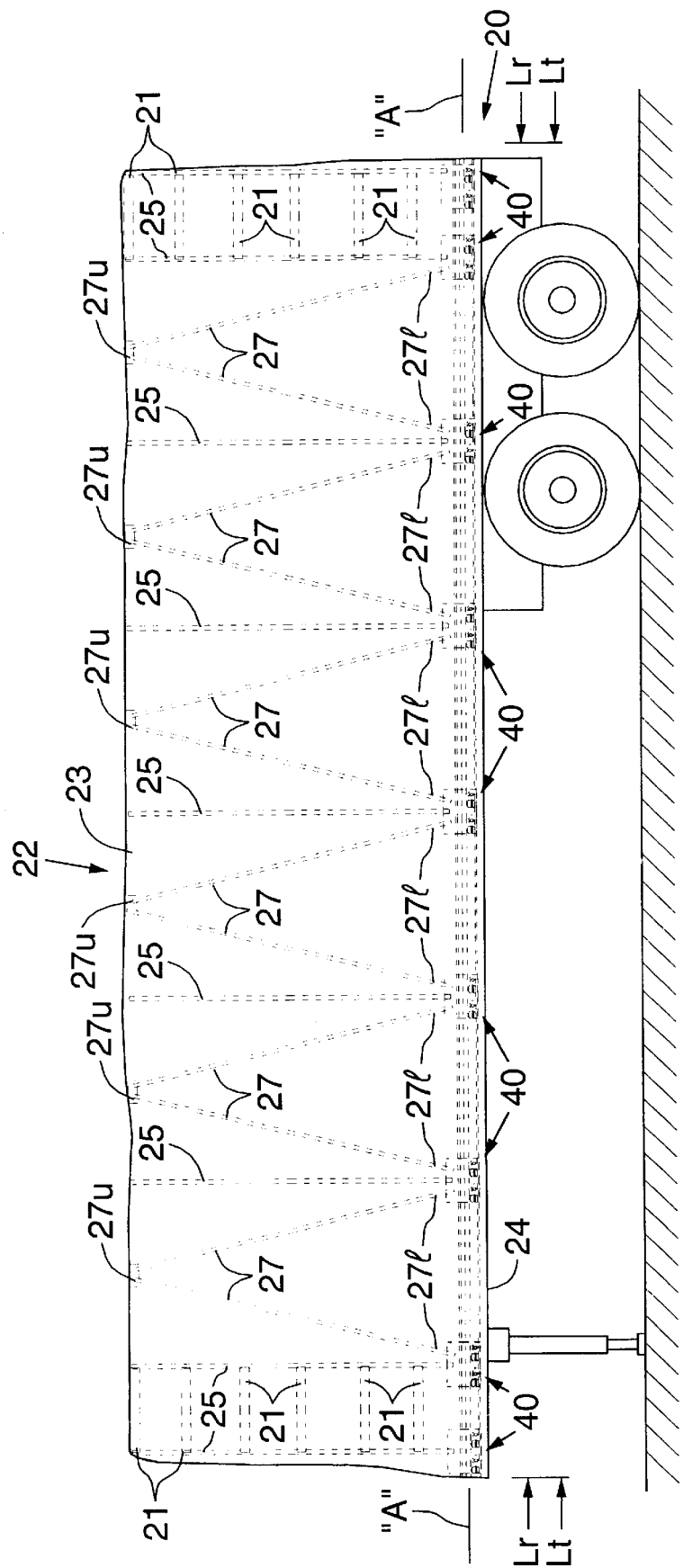
FIG. 2 is a side elevational view of the preferred embodiment of track and trolley assembly of FIG. 1.
Figure 3:
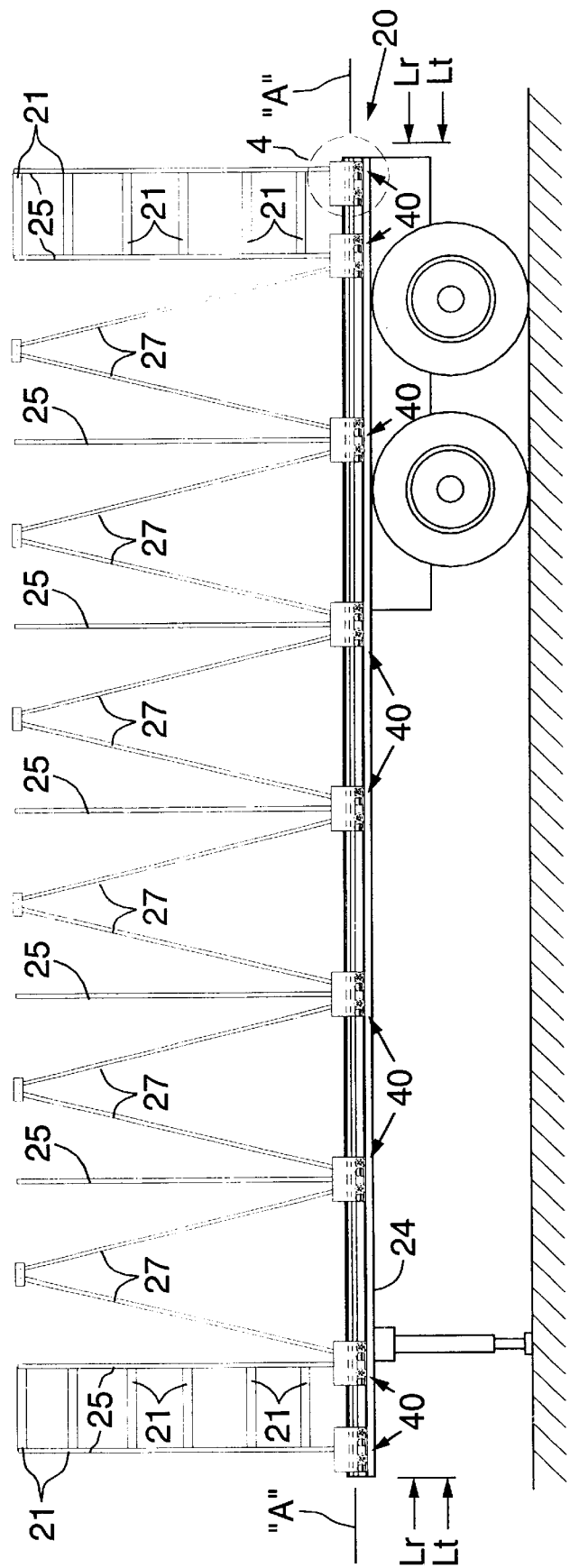
FIG. 3 is a side elevational view similar to FIG. 2, but with the tarpaulin of the tarpaulin enclosing system removed.
Figure 4:
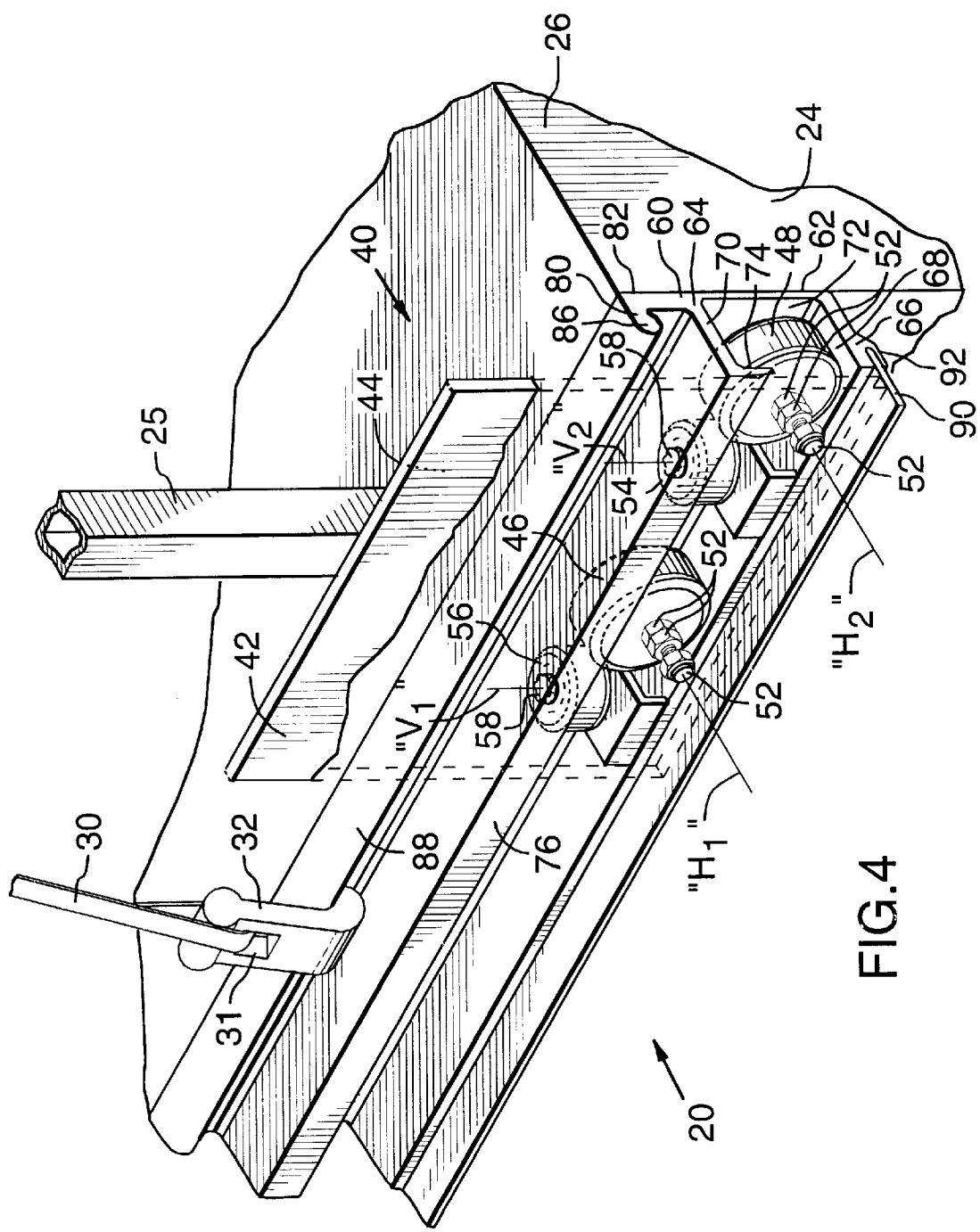
FIG. 4 is a perspective view, on an enlarged scale, and from the back end, of the encircled area 4 of FIG. 3, showing one of the trolley members partly in phantom outline.
Figure 5:
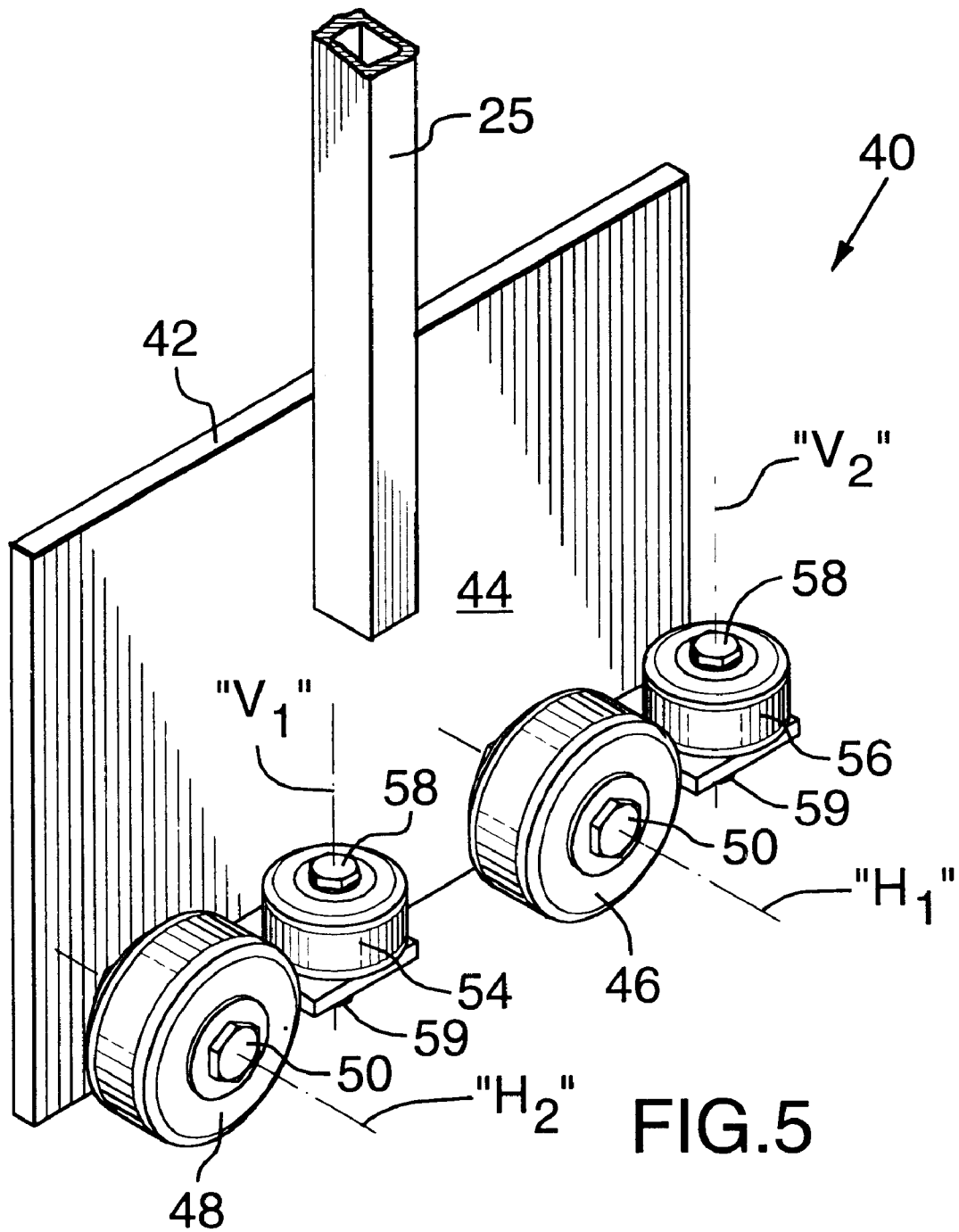
FIG. 5 is a perspective view of the trolley member of FIG. 4, removed from the corresponding track member.
Figure 8:
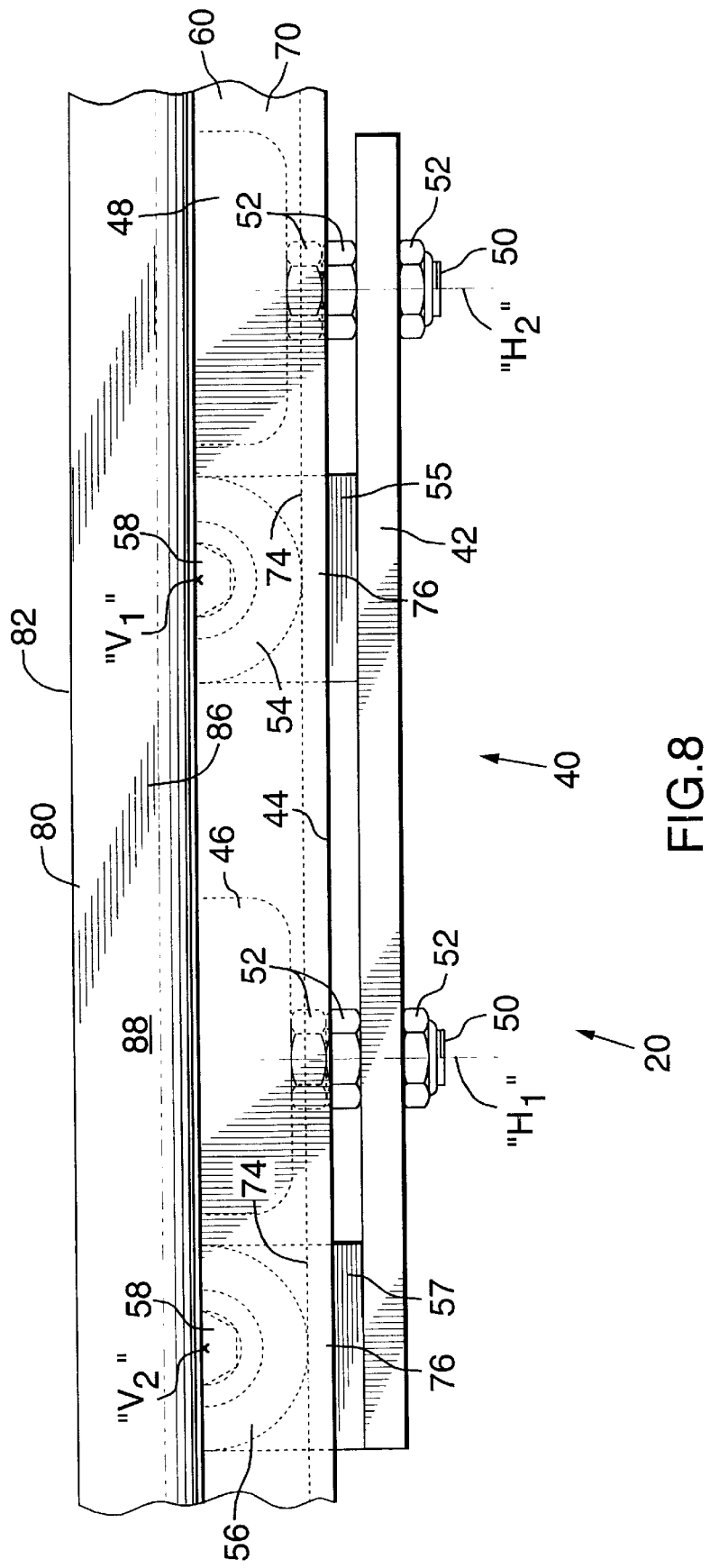
FIG. 8 is a top plan view of a portion of the track and trolley assembly of FIG. 4.
Figure 9:
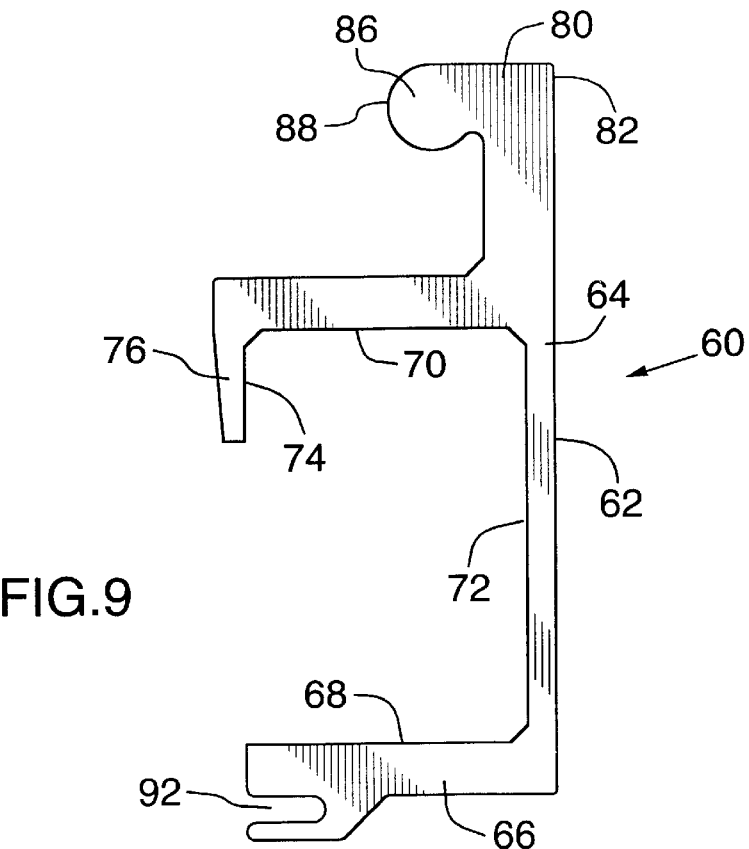
FIG. 9 is an end elevational view of the left rail of the preferred embodiment track and trolley assembly of FIG. 1.

A rail means 80 having a length "L$_r$" is disposed substantially along the length of the elongate track means 60 with the track means 60 and the rail means 80 being substantially the same length, such that L$_r$=L$_t$, as seen in FIGS. 2 and 3. In the preferred embodiment illustrated, the track means 60 and rail means 80 are integrally formed one with the other by means of an aluminum extrusion, and accordingly are of a constant cross-section. The elongate track means 60 and rail means 80 may, however, also be constructed as separate one from the other.

The rail means 80 has a substantially vertical trailer mounting face 82 that engages a lateral side edge **26*l*,26*r* of the bed portion 26 of the flat bed trailer 24. The integrally formed track means 60 and rail means 80 are removably mounted on a lateral side edge 26*l*,26*r* of the flat bed trailer 24 by means of suitable threaded fasteners 84 and co-operating nuts 85, as can be best seen in FIG. 7**.

A hook-receiving rail portion 86 is disposed in laterally outwardly projecting cantilever relation from the trailer mounting face 82 so as to be free and clear of the substantially vertical trailer mounting face 82. The hook-receiving rail portion 86 presents a substantially convex engagement surface 88 for receiving at least one tie-down hook 32 in releasably retained relation therealong. The hook-receiving rail portion 86 of the rail means 80 is preferably disposed above the upper vertical extent of the elongate track means 60 and, in any event, is disposed above the substantially horizontal weight-bearing roller receiving surface 68 of the elongate track means 60, and above the first 72 and second 74 substantially vertical stabilizing roller receiving surfaces of the elongate track means 60. The substantially horizontal weight-bearing roller receiving surface 68 projects laterally outwardly in a direction away from the mounting face 62 further than the hook-receiving rail portion 86 of the rail means 80 so as to permit the trollies 40, specifically the frame members 42 of the trollies 40, to pass by the hooks 32 of the tie-down straps 30 engaged on the hook-receiving rail portion 86.

As can be best seen in FIG. 6, the tarpaulin 23 of the tarpaulin enclosing system 22 preferably extends downwardly past the substantially horizontal weight bearing roller receiving surface 68 of the lower shelf portion 66 of the elongate track means 60 in order to help block dirt and debris from a road surface from reaching the elongate track means 60, the trollies 40, and the rail means 80, as any dirt and debris retained on the elongate track means 60 may significantly hamper the rolling action of the trollies 40 along the elongate track means 60. However, such blocking of dirt and debris by the tarpaulin 23 is only partially successful. In order to further preclude dirt and debris from reaching the elongate track means 60, the trollies 40, and the rail means 80, a removable and replaceable rubber contact strip 90 is preferably mounted in a horizontally directed channel 92 found on the outer edge of the lower shelf portion 66 in laterally outwardly projecting relation beyond the frame member 42, so as to frictionally contact the tarpaulin 23 adjacent and along its lowermost edge.

In use, a load 29 is secured to the bed portion 26 of the flat bed trailer 24 by tie-down straps 30, as can be best seen in FIG. 1, with the tarpaulin enclosing system 22 in its open configuration (not shown). The tie-down straps 30 are adjustably fitted through an opening 31 formed in the tie down hooks 32, and buckle means or the like for such adjustment (not shown) will be known and readily apparent to those skilled in the art. After securing the load 29 with one or more tie-down straps 30 as referenced above, the tarpaulin enclosing system 22 is then moved to its trailer enclosing configuration, as can be best seen in FIG. 2, wherein the trollies 40 move along the elongate track means 60 such that the frame members 42 of the trollies 40 are disposed horizontally outboard of the hook-receiving rail portion 86 of the rail means 80. In this manner, the tie-down hooks 32 of the tie-down straps 30 do not interfere with the operation of the trollies 40 along the elongate track means 60. Also, the operation of the trollies 40 along the elongate track means 60 does not interfere with the tie-down hooks 32 of the tie-down straps 30. Further, as can be best seen in FIG. 6, the tie-down straps 30 can engage the hook-receiving rail portion 86 of the rail means 80 at a plurality of angles, thus permitting any size load accommodated by the bed portion 26 of the flat bed trailer 24 to be properly secured. One tie-down hook 32 and the end portion of one tie-down strap 30 are shown in solid lining in FIG. 6 disposed at an angle that would be typically realized when securing a medium size load. The same tie-down hook 32 and tie-down strap 30 are also shown twice in ghost outline, shown once disposed at an angle that would be typically realized when securing a small size load, and shown once disposed at an angle that would be typically realized when securing a large size load. Moreover, since the hook receiving rail portion 86 of the rail means 80 is continuous along its length "L_r", the tie-down hooks 32 may be positioned anywhere along the length "L_r" of the hook receiving rail portion 86.

As can be best seen in FIG. 6, the width of the elongate track means 60 is minimized since the engagement of the tie-down hooks 32 of the tie-down straps 30 on the hook receiving rail portion 86 of the rail means 80 is independent of the elongate track means 60. Accordingly, tie-down hooks 32 can be made in any useful configuration, and do not need to be narrow to pass through existing spaces between an elongate track and the side edge of the bed portion of a flat bed trailer. Further, conventional adjustable chains can be readily used in place of the tie-down straps illustrated, since the diameter of the chain links is not an issue with the track and trolley assembly 20 of the present invention.

Figure 12:
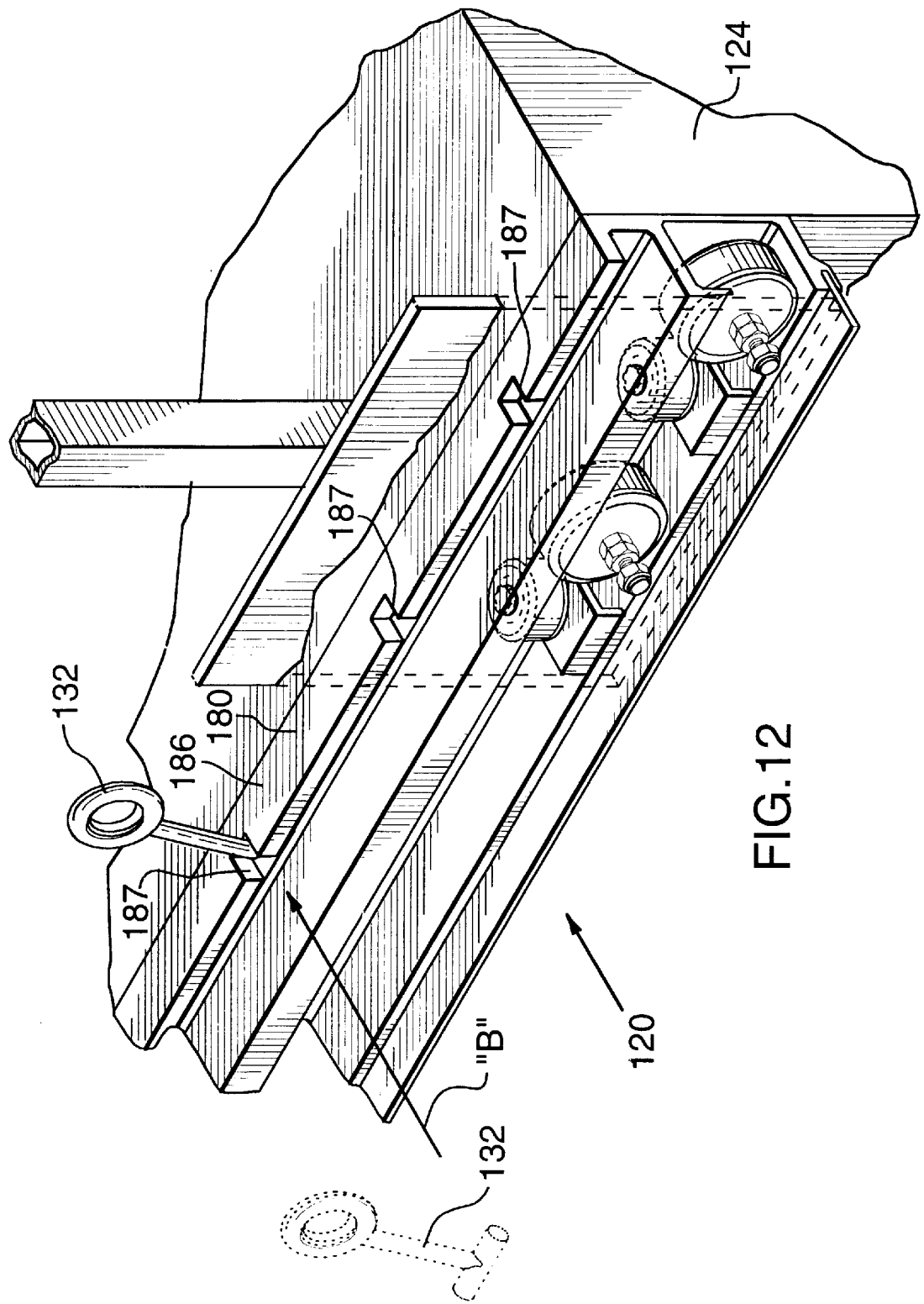
FIG. 12 is a perspective view from the back end of an alternative embodiment track and trolley assembly according to the present invention, showing a portion of the left side track and the rearmost trolley engaged therein.
Figure 13:
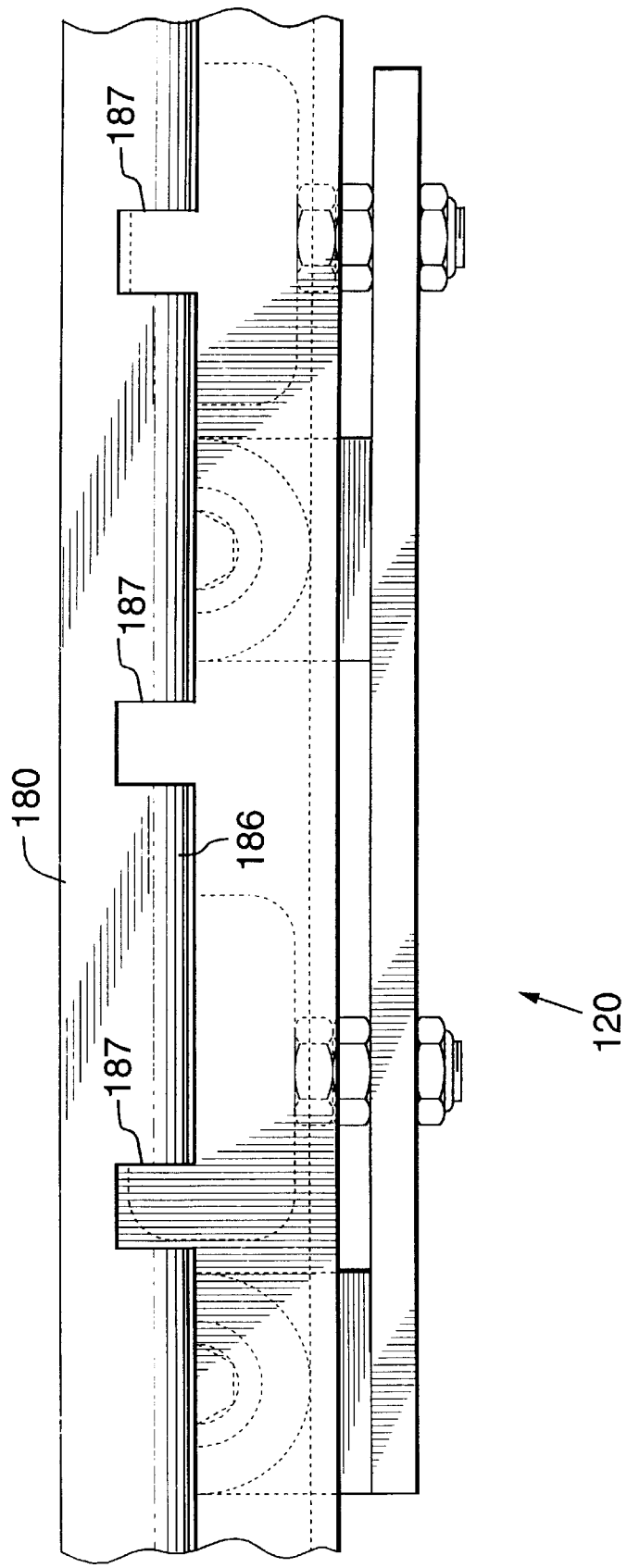
FIG. 13 is a top plan view of a portion of the alternative embodiment track and trolley assembly of FIG. 12; and, FIG. 14 is an end elevational view of the alternative embodiment track and trolley assembly of FIG. 12.
Figure 14:
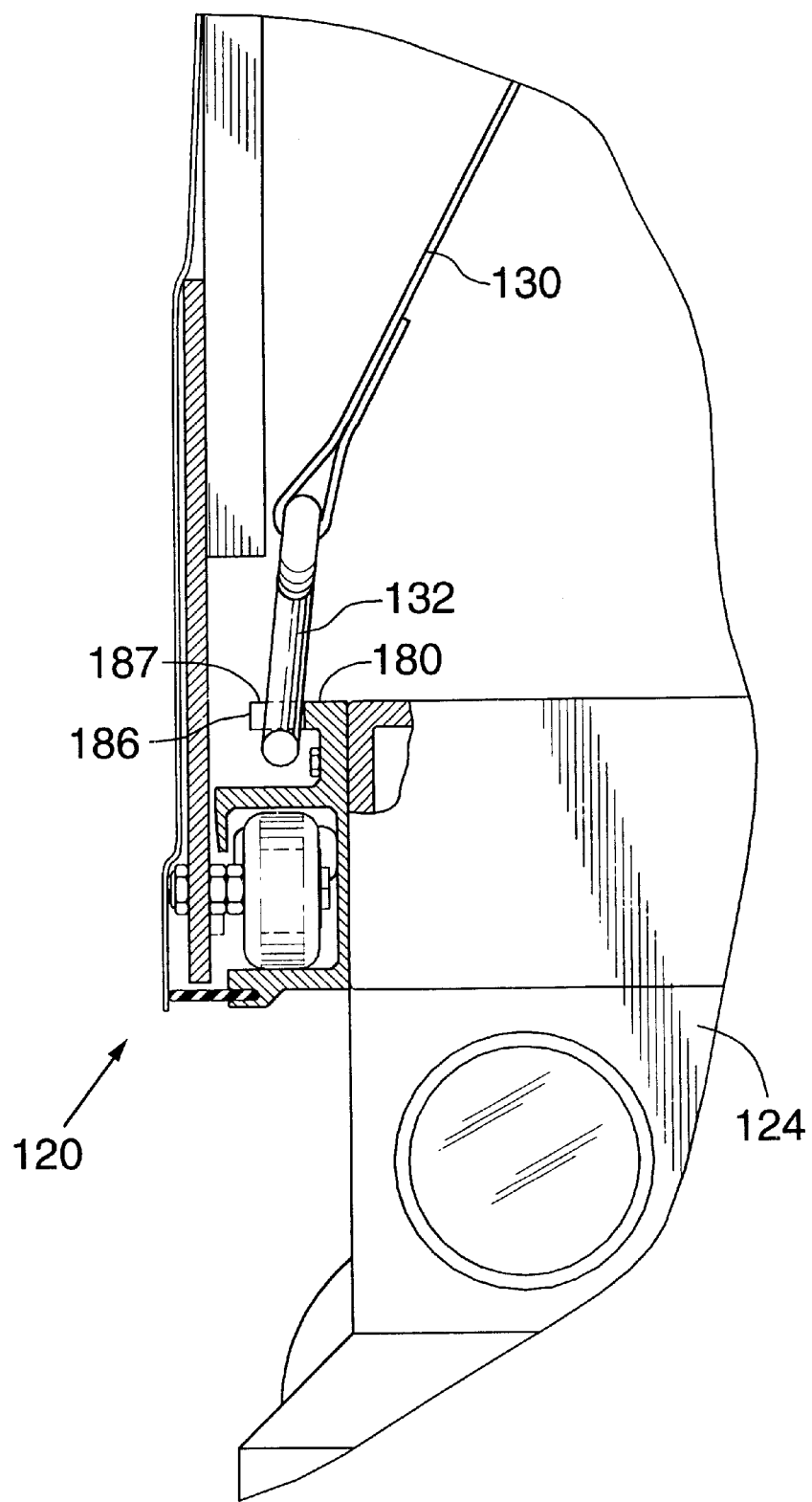

Reference will now be made to FIGS. 12 through 14 of the drawings, which show an alternative embodiment of track and trolley assembly 20, as indicated by the general reference numeral 120. The track and trolley assembly 120 is for use with a tarpaulin enclosing system (not fully illustrated) on a flat bed trailer 124. The track and trolley assembly 120 is similar to the track and trolley assembly 20 disclosed above in the preferred embodiment, except for differences in the hook-receiving rail portion 186 of the rail means 180 and the tie-down hooks 132 used with the tie-down straps 130 that hook onto the hook-receiving rail portion 186. In the alternative embodiment illustrated, the hook-receiving rail portion 186 of the rail means 180 includes a plurality of discrete notches 187 disposed in evenly spaced relation along its length, which discrete notches 187 are each shaped and dimensioned to receive co-operating "T"-shaped tie-down hooks 132 of the tie-down straps 130 in releasably retained relation, as indicated by arrow "B" in FIG. 12.

Other routine variations of the above principles will be apparent to those who are knowledgeable in the field of the invention, and such variations are considered to be within the scope of the present invention. Further, other modifications and alterations may be used in the design and manufacture of the apparatus of the present invention without departing from the spirit and scope of the invention as set out in the accompanying claims.

I claim:

1. A track and trolley assembly for use with a tarpaulin enclosing system on a flat bed trailer defining a central longitudinal axis and having a bed portion laterally defined by left and right lateral side edges, said track and trolley assembly comprising:

a plurality of trollies for operatively supporting said tarpaulin enclosing system, each trolley having a frame member, at least one weight-bearing roller mounted on said frame member for rotation about a substantially horizontal axis and at least one stabilizing roller mounted on said frame member for rotation about a substantially vertical axis;

an elongate track means having a length, a substantially vertical trailer mounting face, a substantially horizontal weight-bearing roller receiving surface disposed along the length of said elongate track means, and at least one substantially vertical stabilizing roller receiving surface disposed along the length of said elongate track means; and, a rail means disposed substantially along the length of said elongate track means and having a length, a substantially vertical trailer mounting face, and a hook-receiving rail portion disposed in laterally outwardly projecting cantilever relation from said trailer mounting face so as to be free and clear of said substantially vertical trailer mounting face, and disposed above said substantially horizontal weight-bearing roller receiving surface of said elongate track means and above said at least one substantially vertical stabilizing roller receiving surface of said elongate track means, for receiving at least one tie-down hook in releasably retained relation therealong;

wherein said trollies move along said elongate track means such that said frame members of said trollies are disposed horizontally outboard of said hook-receiving rail portion of said rail means.

2. The track and trolley assembly of claim 1, wherein said hook-receiving rail portion of said rail means includes a plurality of discrete notches disposed along its length, which discrete notches are each shaped and dimensioned to receive said at least one tie-down hook in releasably retained relation.

3. The track and trolley assembly of claim 2, wherein said discrete notches are disposed in evenly spaced relation along the length of said hook-receiving rail portion of said rail means.

4. The track and trolley assembly of claim 1, wherein said hook-receiving rail portion of said rail means is disposed above the upper vertical extent of said elongate track means.

5. The track and trolley assembly of claim 4, wherein said substantially horizontal weight-bearing roller receiving surface projects laterally outwardly in a direction away from said mounting face farther than said hook-receiving rail portion of said rail means.

6. The track and trolley assembly of claim 5, wherein said elongate track means comprises a substantially vertical wall portion and said substantially vertical trailer mounting face is disposed on said substantially vertical wall portion in laterally inwardly facing relation to a lateral side edge of said flat bed trailer.

7. The track and trolley assembly of claim 6, wherein said elongate track means comprises a substantially horizontal lower shelf portion projecting laterally outwardly from said substantially vertical wall portion, with said weight-bearing roller receiving surface being disposed atop said substantially horizontal lower shelf portion.

8. The track and trolley assembly of claim 7, wherein said elongate track means comprises a substantially horizontal upper shelf portion projecting laterally outwardly from said substantially vertical wall portion and disposed above said lower shelf portion, such that said weight-bearing rollers are disposed between said upper and lower shelf portions.

9. The track and trolley assembly of claim 8, wherein said at least one substantially vertical stabilizing roller receiving surface comprises opposed first and second substantially vertical stabilizing roller receiving surfaces.

10. The track and trolley assembly of claim 9, wherein said first substantially vertical stabilizing roller receiving surface is disposed on said substantially vertical wall portion in laterally outwardly facing relation to lateral side edge of said flat bed trailer.

11. The track and trolley assembly of claim 10, further comprising a downwardly depending flange portion downwardly depending from said substantially horizontal upper shelf portion and disposed along the length of said elongate track means horizontally outboard of said at least one weight-bearing roller and said at least one stabilizing roller, to preclude unchecked outward horizontal movement of said trollies with respect to said track means.

12. The track and trolley assembly of claim 11, wherein said second substantially vertical stabilizing roller receiving surface is disposed on said downwardly depending flange member in laterally inwardly facing relation to a lateral side edge of said flat bed trailer.

13. The track and trolley assembly of claim 12, wherein each of said trollies comprises a first weight-bearing roller disposed forwardly of a second weight-bearing roller.

14. The track and trolley assembly of claim 13, wherein each of said trollies has a first stabilizing roller interposed between said first and second weight bearing rollers.

15. The track and trolley assembly of claim 14, wherein each of said trollies further comprises a second stabilizing roller disposed ahead of said second weight bearing roller.

16. The track and trolley assembly of claim 15, wherein said hook-receiving rail portion presents a substantially convex engagement surface.

17. The track and trolley assembly of claim 16, wherein said track means and rail means are substantially the same length.

18. The track and trolley assembly of claim 17, wherein said track means and rail means are integrally formed one with the other.

19. The track and trolley assembly of claim 17, wherein said integrally formed track means and rail means are removably mounted on a lateral side edge of said flat bed trailer.

20. The track and trolley assembly of claim 19, wherein said integrally formed track means and rail means are of a constant cross section.

21. The track and trolley assembly of claim 20, wherein said integrally formed track means and rail means are extruded.

22. The track and trolley assembly of claim 20, wherein the tarpaulin of the tarpaulin enclosing system extends downwardly past the substantially horizontal weight-bearing roller receiving surface of the lower shelf portion of said elongate track means.

23. The track and trolley assembly of claim 22, further comprising a rubber contact strip mounted on said lower shelf portion in laterally outwardly projecting relation beyond said frame member.

* * * * *